(12) United States Patent
Chen (10) Patent No.: US 9,256,513 B2
(45) Date of Patent: Feb. 9, 2016

(54) METHOD, APPARATUS AND COMPUTER READABLE MEDIUM FOR AUTOMATIC DEBUGGING AND ERROR PREVENTION

(71) Applicant: Wistron Corporation, New Taipei (TW)

(72) Inventor: Shao-Fong Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 67 days.

(21) Appl. No.: 14/201,945

(22) Filed: Mar. 10, 2014

(65) Prior Publication Data

US 2015/0121344 A1  Apr. 30, 2015

(30) Foreign Application Priority Data

Oct. 25, 2013  (TW) .............................. 102138752 A (51) Int. Cl.
*G06F 9/44* (2006.01)
*G06F 11/36* (2006.01)

(52) U.S. Cl.
CPC .......... *G06F 11/362* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| 5,428,618 | A * | 6/1995 | Ueki et al. ..................... 717/124 |
| 8,572,583 | B2 * | 10/2013 | Bae et al. ....................... 717/124 |
| 8,615,740 | B2 * | 12/2013 | Thompson .................... 717/124 |
| 2013/0166967 | A1 * | 6/2013 | Jerde et al. ...................... 714/48 |

FOREIGN PATENT DOCUMENTS

TW  200825732  6/2008

OTHER PUBLICATIONS

Reis et al., Software-Controlled Fault Tolerance, ACM Transactions on Architecture and Code Optimization (TACO), vol. 2, Issue 4, Dec. 2005, pp. 366-396.*
Xu et al., Fault Tolerance in Concurrent object-oriented software through coordinated error recovery, Published in Twenty-Fifth Internation Symposium on Fault-Tolerant Computing, Jun. 27-30, 1995, pp. 499-508.*
"Office Action of Taiwan Counterpart Application", issued on Jul. 21, 2015, p. 1-p. 9.

* cited by examiner

*Primary Examiner* — Wei Zhen
*Assistant Examiner* — Timothy Duncan
(74) *Attorney, Agent, or Firm* — Jianq Chyun IP Office (57) ABSTRACT

A method, an apparatus and a computer readable medium for debugging and error prevention are provided. In the method, a plurality of debug messages produced by the electronic apparatus in executing debugging is obtained. The debug messages are analyzed to find a plurality of operation procedures associated with each other and having a number of repeated occurrences reaching a threshold according to data of each debug message when at least one error message appears in the debug messages and accordingly conclude at least one error procedure rule. Then, each debug message obtained afterwards is compared with the operation procedures in each error procedure rule sequentially, so as to determine whether a completion percentage of the operation procedures in each error procedure rule reaches a preset percentage. When the completion percentage reaches the preset percentage, a preventive operation of the operation procedure corresponding to the current debug message is executed.

20 Claims, 8 Drawing Sheets

```
01.ID777 - 2013/6/1 - 13:00:00; System; operation; execute camera APP
02.ID777 - 2013/6/1 - 13:00:10; Touch; operation; click X=100, Y=10
03.ID777 - 2013/6/1 - 13:00:20; Camera; operation; take single photo
04.ID777 - 2013/6/1 - 13:00:21; Camera; operation; success in saving photo
05.ID777 - 2013/6/1 - 13:00:35; Camera; operation; turn off camera APP
06.ID777 - 2013/6/1 - 13:00:38; System; operation; execute camera APP
07.ID777 - 2013/6/1 - 13:00:40; Touch; operation; click X=200, Y=35
08.ID777 - 2013/6/1 - 13:00:40; Camera; setting; set flash open
09.ID777 - 2013/6/1 - 13:00:55; Keyboard; operation; press shutter button
10.ID777 - 2013/6/1 - 13:00:55; Camera; operation; take single photo
11.ID777 - 2013/6/1 - 13:00:55; Camera; operation; success in saving photo
12.ID777 - 2013/6/1 - 13:01:02; Camera; operation; turn off camera APP
```

```
01. ID777 - 2013/6/1 - 12:00:00; System; operation; execute camera APP
02. ID777 - 2013/6/1 - 12:00:20; Touch; operation; click X=200, Y=35
03. ID777 - 2013/6/1 - 12:00:20; Camera; setting; set flash open
04. ID777 - 2013/6/1 - 12:00:21; Keyboard; operation; press shutter button
05. ID777 - 2013/6/1 - 12:00:35; Camera; operation; take single photo
06. ID777 - 2013/6/1 - 12:00:40; Camera; operation; success in saving photo
07. ID777 - 2013/6/1 - 12:00:41; Camera; setting; multiple burst
```

METHOD, APPARATUS AND COMPUTER READABLE MEDIUM FOR AUTOMATIC DEBUGGING AND ERROR PREVENTION

CROSS-REFERENCE TO RELATED APPLICATION

This application claims the priority benefit of Taiwan application serial no. 102138752, filed on Oct. 25, 2013. The entirety of the above-mentioned patent application is hereby incorporated by reference herein and made a part of this specification.

BACKGROUND

1. Technical Field

The invention relates to a method and an apparatus for debugging. Particularly, the invention relates to a method, an apparatus and a computer readable medium for automatic debugging and error prevention.

2. Related Art

Along with development of technology and widespread of electronic apparatus such as smart phones, or tablet PCs, various software and firmware are developed to provide the user with diversified applications.

Generally, when the software or firmware is developed, a developer debugs the software or the firmware with assistance of debug messages. In the current development mode, the developer generally tries to duplicate an error operation and collect the debug messages to perform debugging in a passive way after the problem is occurred. However, after products are delivered, the developer is hard to collect the debug messages, which leads to a result that subsequent tracing and debugging of the product are difficult to be implemented at the development end, and the developer can only passively wait for occurrence of the problems, and then retrieve the product for debugging. In view of the client end, repeated occurrence of the error procedure prevents the user from fluently operating the electronic apparatus, and causes a usage trouble.

Therefore, it is necessary to provide a convenient method to assist the development end to implement debugging, so as to prevent the stability of the electronic apparatus from being influenced by the error procedure.

SUMMARY

The invention is directed to a method, an apparatus and a computer readable medium for automatic debugging and error prevention, by which error procedure rules are automatically concluded to determine whether an error procedure is occurred, so as to execute a preventive operation, and accordingly ameliorate stability of the electronic apparatus.

The invention provides a method for automatic debugging and error prevention, which is adapted to an electronic apparatus. In the method, a plurality of debug messages produced by the electronic apparatus in executing debugging is obtained. Then, the debug messages are analyzed to find a plurality of operation procedures associated with each other and having a number of repeated occurrences reaching a first threshold according to data of each debug message when at least one error message appears in the debug messages and accordingly conclude at least one error procedure rule. Then, each debug message obtained afterwards is sequentially compared with the operation procedures in each error procedure rule, so as to determine whether a completion percentage of the operation procedures in each error procedure rule reaches a preset percentage. When the completion percentage reaches the preset percentage, a preventive operation of the operation procedure corresponding to the current debug message is executed.

In an embodiment of the invention, the step of analyzing the debug messages includes following steps. Header data of each debug message is read, and it is determined whether an identifier in the header data is consistent with a preset identifier, and the corresponding debug message is filtered out if the identifier in the header data is not consistent with the preset identifier.

In an embodiment of the invention, the step of finding the operation procedures associated with each other and having the number of repeated occurrences reaching the first threshold according to data of each debug message and accordingly concluding the at least one error procedure rule includes following steps. A maximum combination of the operation procedures associated with each other and having the number of repeated occurrences reaching the first threshold is found from the operation procedures corresponding to the debug message according to an association rule algorithm, and the operation procedures included in the maximum combination are concluded to be the error procedure rule.

In an embodiment of the invention, after the step of finding the operation procedures associated with each other and having the number of repeated occurrences reaching the first threshold according to data of each debug message and accordingly concluding the at least one error procedure rule, the method further includes following steps. It is inquired whether an analysis database includes the concluded error procedure rule, and the error procedure rule is updated to the analysis database if the analysis database does not include the concluded error procedure rule.

In an embodiment of the invention, after the step of obtaining the debug messages produced by the electronic apparatus in executing debugging, the method further includes following steps. The debug messages are analyzed to find a plurality of operation procedures associated with each other and having a number of repeated occurrences reaching a second threshold according to data of each debug message when at least one procedure ending message appears in the debug messages and accordingly conclude at least one correct procedure rule.

In an embodiment of the invention, the step of sequentially comparing each debug message obtained afterwards with the operation procedures in each error procedure rule includes following steps. A comparison state table is established, and a rule identifier and the preset percentage of each error procedure rule are recorded in the comparison state table. A number of batches and the corresponding completion percentage of the operation procedures complied with the debug messages in each error procedure rule in the comparison state table is updated according to a comparison result.

In an embodiment of the invention, after the step of executing the preventive operation of the operation procedure corresponding to the current debug message, the method further includes following steps. A number of times of interception is accumulated, and it is determined whether the error message is obtained afterwards. When the error message is obtained, a number of times of failure is accumulated, and a success rate is calculated according to the number of times of interception and the number of times of failure, so as to determine whether the success rate reaches a preset value. If the success rate reaches the preset value, the preset percentage is increased, and if the success rate does not reach the preset value, the preset percentage is decreased.

In an embodiment of the invention, before the step of executing the preventive operation of the operation procedure corresponding to the current debug message, the method further includes a following step. A control item table is inquired to find the preventive operation used for preventing error occurrence of the operation procedure.

In an embodiment of the invention, the step of inquiring the control item table to find the preventive operation used for preventing error occurrence of the operation procedure includes following steps. If the preventive operation of the operation procedure is found in the control item table, a number of times of prevention of the operation procedure is accumulated. If the preventive operation of the operation procedure is not found in the control item table, the operation procedure is added to the control item table, and the preventive operation corresponding to the operation procedure is preset to be blank.

In an embodiment of the invention, the step of obtaining the debug messages produced by the electronic apparatus in executing debugging includes a following step. The debug messages are obtained from a universal asynchronous receiver-transmitter (UART) driver of the electronic apparatus or an application program interface (API) recording program of each application program in the electronic apparatus.

The invention provides an apparatus for automatic debugging and error prevention including a storage unit and one or a plurality of processing units. The storage unit is configured to record a plurality of modules. The processing unit is coupled to the storage unit for accessing and executing the modules recorded in the storage unit, where the modules include a message obtaining module, a message analysis module, a comparison module and a control module. The message obtaining module is configured to obtain a plurality of debug messages produced by the apparatus in executing debugging. The message analysis module is configured to analyze the debug messages and find a plurality of operation procedures associated with each other and having a number of repeated occurrences reaching a first threshold according to data of each debug message when at least one error message appears in the debug messages and accordingly conclude at least one error procedure rule. The comparison module is configured to sequentially compare each debug message obtained afterwards by the message obtaining module with the operation procedures in each error procedure rule, so as to determine whether a completion percentage of the operation procedures in each error procedure rule reaches a preset percentage. The control module is configured to execute a preventive operation of the operation procedure corresponding to the current debug message when the comparison module determines that the completion percentage reaches the preset percentage.

In an embodiment of the invention, the message analysis module reads header data of each debug message, and filters out the debug message with an identifier in the header data thereof being not consistent with a preset identifier.

In an embodiment of the invention, the message analysis module finds a maximum combination of the operation procedures associated with each other and having the number of repeated occurrences reaching the first threshold from the operation procedures corresponding to the debug message according to an association rule algorithm, and concludes the operation procedures included in the maximum combination to be the error procedure rule.

In an embodiment of the invention, the message analysis module further inquires whether an analysis database includes the concluded error procedure rule, and updates the error procedure rule to the analysis database if the analysis database does not include the concluded error procedure rule.

In an embodiment of the invention, the message analysis module further analyzes the debug messages to find a plurality of operation procedures associated with each other and having a number of repeated occurrences reaching a second threshold according to data of each debug message when at least one procedure ending message appears in the debug messages and accordingly conclude at least one correct procedure rule.

In an embodiment of the invention, the comparison module establishes a comparison state table, and records a rule identifier and the preset percentage of each error procedure rule in the comparison state table, and updates a number of batches and the corresponding completion percentage of the operation procedures complied with the debug messages in each error procedure rule in the comparison state table according to a comparison result.

In an embodiment of the invention, the message analysis module accumulates a number of times of interception after the control module executes the preventive operation of the operation procedure corresponding to the current debug message, and determines whether the message obtaining module obtains the error message afterwards, wherein when the message obtaining module obtains the error message, the message analysis module accumulates a number of times of failure, and calculates a success rate according to the number of times of interception and the number of times of failure, so as to determine whether the success rate reaches a preset value, and the message analysis module increases the preset percentage if the success rate reaches the preset value, and decreases the preset percentage if the success rate does not reach the preset value.

In an embodiment of the invention, the control module further inquires a control item table to find the preventive operation used for preventing error occurrence of the operation procedure.

In an embodiment of the invention, the control module further accumulates a number of times of prevention of the operation procedure if the preventive operation of the operation procedure is found in the control item table, and the control module adds the operation procedure to the control item table if the preventive operation of the operation procedure is not found in the control item table, and presets the preventive operation corresponding to the operation procedure to be blank.

The invention provides a non-transitory computer readable medium, which records a computer program to be loaded to an electronic apparatus to execute following steps. A plurality of debug messages produced by the electronic apparatus in executing debugging is obtained. Then, the debug messages are analyzed to find a plurality of operation procedures associated with each other and having a number of repeated occurrences reaching a first threshold according to data of each debug message when at least one error message appears in the debug messages and accordingly conclude at least one error procedure rule. Then, each debug message obtained afterwards is sequentially compared with the operation procedures in each error procedure rule, so as to determine whether a completion percentage of the operation procedures in each error procedure rule reaches a preset percentage. When the completion percentage reaches the preset percentage, a preventive operation of the operation procedure corresponding to the current debug message is executed.

According to the above descriptions, according to the method, the apparatus and the computer readable medium for automatic debugging and error prevention of the invention, the error procedure rule is concluded, and the currently executed operation procedure is compared with the error procedure rule to determine whether currently executed operation procedure is complied with the error procedure rule, and when it is determined that the currently executed operation procedure is complied with the error procedure rule, the corresponding preventive operation is executed. Moreover, by calculating the success rate of the automatic debugging and error prevention and adjusting the preset percentage of completion of the error procedure rule, accuracy of the automatic debugging and error prevention are improved. In this way, error occurrence is prevented to improve stability of the electronic apparatus, so as to provide the user a better operation experience.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

According to user's experience of operating an electronic apparatus, a situation that the electronic apparatus is malfunctioned or has an error (for example, system failure) is generally occurred when the user executes certain procedures in a certain sequence. Therefore, in the invention, based on the debug messages produced by the electronic apparatus in executing debugging, error procedure rules are concluded according to association between the debug messages and a number of repeated occurrences thereof, and a debug message obtained afterwards is compared with the error procedure rules, and when a success rate reaches a certain value, it is determined that the electronic apparatus is about to have an error, and a preventive operation is executed. In this way, automatic debugging and error prevention of the electronic apparatus are achieved, so as to improve stability of the electronic apparatus and assist a developer in executing debugging.

Figure 1:
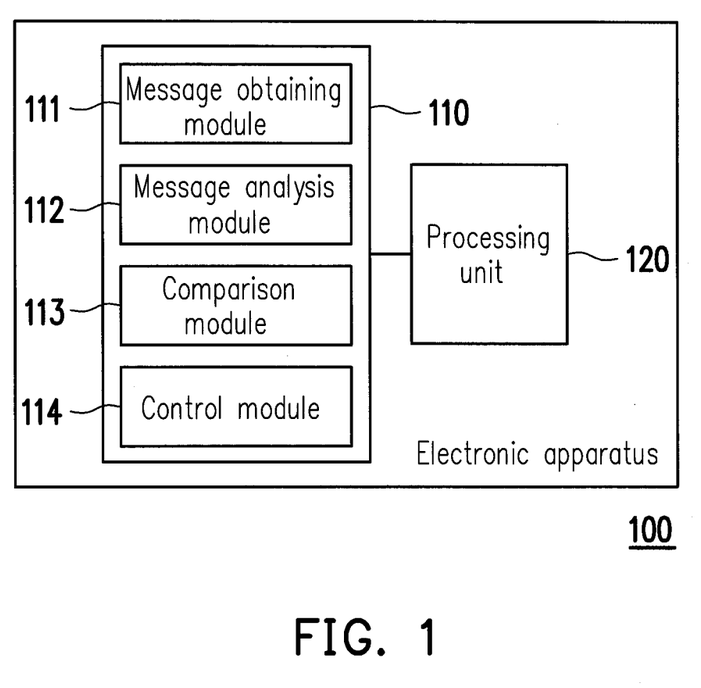
FIG. 1 is a block diagram of an apparatus for automatic debugging and error prevention according to an embodiment of the invention.

FIG. 1 is a block diagram of an apparatus for automatic debugging and error prevention according to an embodiment of the invention. Referring to FIG. 1, the apparatus for automatic debugging and error prevention 100 of the present embodiment is, for example, an electronic apparatus (which is referred to as an electronic apparatus 100 hereinafter) such as a mobile phone, a tablet personal computer (PC), a personal digital assistant (PDA), a notebook computer or a desktop computer, and the type of the electronic apparatus 100 is not limited by the invention. The electronic apparatus 100 of the present embodiment includes a storage unit 110 and one or a plurality of processing units 120, and functions thereof are as follows.

The storage unit 110 is, for example, any type of fixed or movable random access memory (RAM), read-only memory (ROM), flash memory or similar devices or a combination of the above devices. In the present embodiment, the storage unit 110 is configured to record a message obtaining module 111, a message analysis module 112, a comparison module 113 and a control module 114.

The processing unit 120 is coupled to the storage unit 110. The processing unit 120 is, for example, a central processing unit (CPU), or other programmable general-purpose or special-purpose microprocessor, digital signal processor (DSP), programmable controller, application specific integrated circuit (ASIC) or other similar devices or a combination of the above devices. In the present embodiment, the processing unit 120 is configured to access and execute the modules recorded in the storage unit 110 to implement the method for automatic debugging and error prevention of the embodiment.

Figure 2:
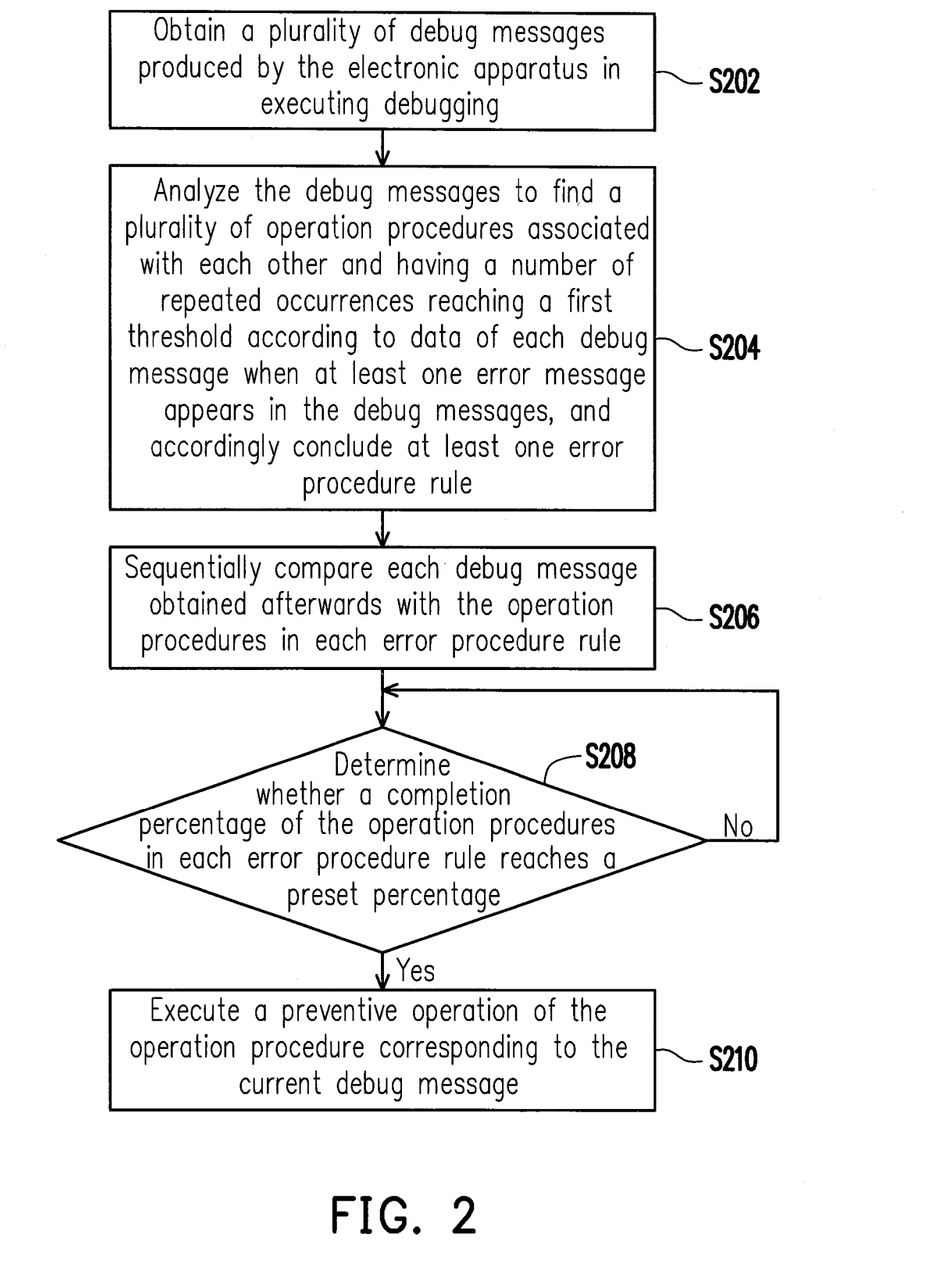
FIG. 2 is a flowchart illustrating a method for automatic debugging and error prevention according to an embodiment of the invention.

FIG. 2 is a flowchart illustrating a method for automatic debugging and error prevention according to an embodiment of the invention. Referring to FIG. 1 and FIG. 2, the method of the present embodiment is adapted to the electronic apparatus 100, and a detailed flow of the method of the present embodiment is described below with reference of various components of the electronic apparatus 100 in FIG. 1.

First, the message obtaining module 111 obtains a plurality of debug messages produced by the electronic apparatus 100 in executing debugging (step S202). In the present embodiment, the electronic apparatus 100 can apply an existing software operating system, for example, Windows®, Ubuntu™ or Android™ (Windows® is a trademark of Microsoft Corporation, Ubuntu™ is a trademark of Judith Paulsen, and Android™ is a trademark of Google Inc), etc. In an environment of the Android operating system, the message obtaining module 111 may obtain the debug messages from a universal asynchronous receiver-transmitter (UART) driver of the electronic apparatus 100, and in an environment of the Windows operating system, the message obtaining module 111 may obtain the debug messages from an application program interface (API) recording program of each application program of the electronic apparatus 100, which is not limited by the invention.

In detail, in the present embodiment, the message obtaining module 111 may obtain the debug messages from a path through which the electronic apparatus 100 outputs the debug messages, or may be directly written into a program that the electronic apparatus 100 generates the debug messages so as to obtain the debug messages. For example, FIG. 3 and FIG. 4 are examples of the method for automatic debugging and error prevention according to an embodiment of the invention, where FIG. 3 illustrates a system structure of the Android system, and FIG. 4 illustrates an application software structure of the Windows system, which are respectively described below.

Figure 3:
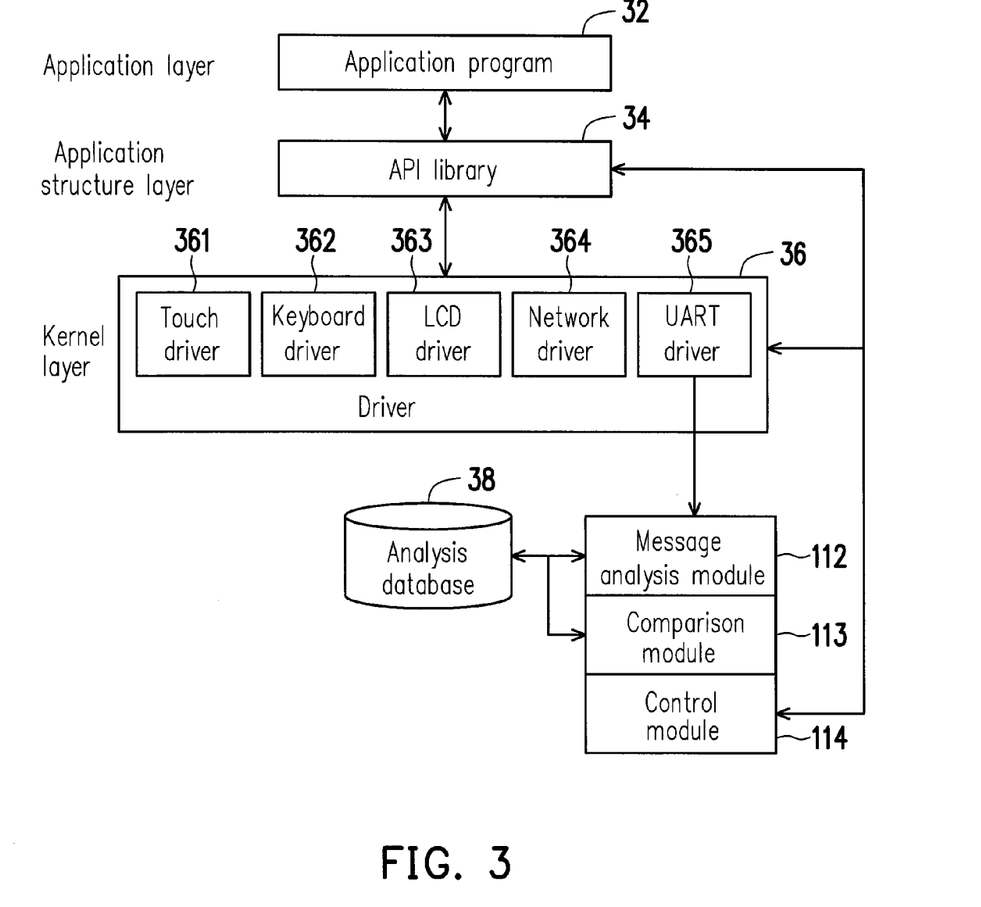
FIG. 3 is an example of a method for automatic debugging and error prevention according to an embodiment of the invention.

Referring to FIG. 3, the system structure of the Android system includes an application layer composed of a plurality of application programs 32, an application structure layer including an API library 34, and a kernel layer including a plurality of drivers 36 (including a touch driver 361, a keyboard driver 362, a liquid crystal display (LCD) driver 363, a network driver 364 and a UART driver 365). The commonly used handheld apparatus generally outputs the debug messages through the UART driver 365. Therefore, in the present embodiment, by writing the message obtaining module 111 into a source code of the UART driver 365, the debug messages originally output through the UART driver 365 are duplicated and output to the message analysis module 112 for analyzing the error procedure rules. The error procedure rules found by the message analysis module 112 are stored into an analysis database 38 for the use of a subsequent comparison operation of the comparison module 113. On the other hand, the control module 114 may control the system to execute various functions (for example, display a warning message, stop a touch function, stop a keyboard function, etc.) by calling a function in the API library 34, or control each of the drivers 36 through inter-process communication (IPC) so as to actively prevent the user from executing an error procedure or stopping a part of the functions.

It should be noticed that, in another embodiment of the invention, the message obtaining module 111 is not limited to be mounted in the UART driver. In detail, in a Linux system structure, the message obtaining module 111 can also be implemented in a service program deamon of the Linux system for obtaining a kernel debug message (kmsg) of the Linux system. In overall, the method of the present embodiment is applicable as long as a mounting point of the message obtaining module 111 can be found in various systems to capture the debug messages, so as to implement automatic debugging and error prevention of the electronic apparatus.

Figure 4:
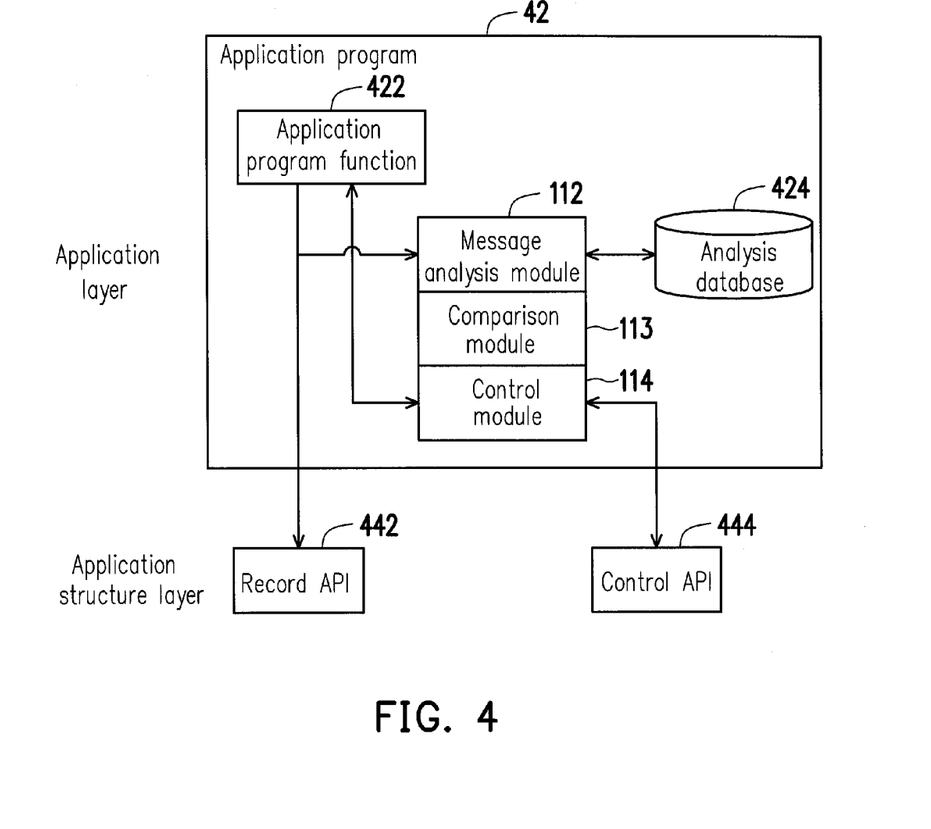
FIG. 4 is an example of a method for automatic debugging and error prevention according to an embodiment of the invention.

On the other hand, referring to FIG. 4, the Windows system structure includes an application layer composed of an application program 42 and an application structure layer including a record API function 442 and a control API function 444. In the present embodiment, when the Windows application programs are developed, the message obtaining module 111 is written into a source code of an application program function 422 of the application program 42, and the message analysis module 112, the comparison module 113 and the control module 114 are written into a source code of the application program 42, such that when the application program 42 calls the record API function 442 through the application program function 422 to record a log file, the application program 42 also transmits the debug messages to the message analysis module 112, so as to analyze the error procedure rule. After the message analysis module 112 finds the error procedure rule, the message analysis module 112 stores the error procedure rule to an analysis database 424 for the use of a subsequent comparison operation of the comparison module 113. The control module 114 can directly control the application program function 422 (for example, controls whether to press a certain key or whether to display a certain function, etc.), or control the system functions by calling the control API function 444, so as to prevent the user from executing an error procedure or stop a part of the functions. For example, if a sound receiving function of the application program has a problem, and causes system failure when a system microphone is turned on, when the application program is executed, the control module 114 calls the control API function 444 to stop a function of the system microphone, so as to prevent the system failure.

Figure 5:
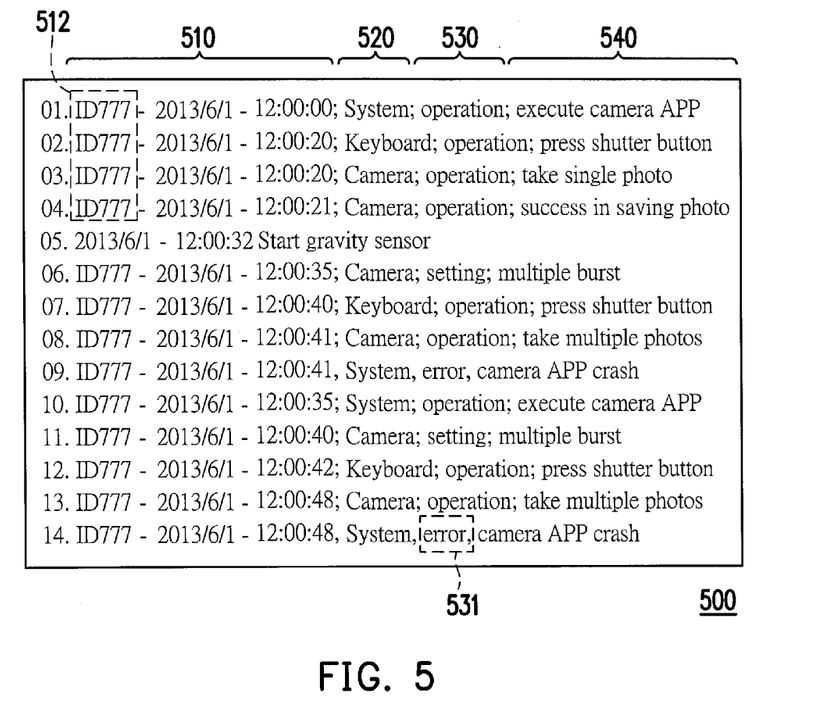
FIG. 5 is an example of concluding an error procedure rule according to an embodiment of the invention.

It should be noticed that, in the present embodiment of the invention, the message obtaining module 111 may obtain the debug messages including various types of field data such as time, type, function, or information, and record related information of the operation procedure. For example, FIG. 5 is an example of concluding an error procedure rule according to an embodiment of the invention. As shown in FIG. 5, a debug message list 500 includes a time field 510, a function field 520, a type field 530 and an information field 540. The time field 510 records a message occurrence time, and includes header data 512. The header data 512 has an identifier for identifying whether the corresponding debug message is used in the method for automatic debugging and error prevention of the present embodiment. The function field 520 records data of a function executed by a component such as camera, keyboard or system which the operation procedure corresponding the debug message belongs to. The type field 530 records data of type such as operation, setting, or event which the debug message is related to. The type field 530 further includes an error type 531 for recording the operation procedure having an error. The information field 540 records a detailed description of the debug message.

Referring back to the flow of FIG. 2, after the message obtaining module 111 obtains the debug messages, the message analysis module 112 analyzes the debug messages and finds a plurality of operation procedures associated with each other and having a number of repeated occurrences reaching a first threshold according to data of each debug message when at least one error message appears in the debug messages and accordingly concludes at least one error procedure rule (step S204). In detail, in an embodiment, when the message analysis module 112 finds an error message (for example, the debug message with a referential number of 09) in the debug message list 500, the message analysis module 112 records an error occurrence time, and when such error message again appears (for example, the debug message with a referential number of 14), the message analysis module 112 finds a maximum combination of the operation procedures associated with each other and having the number of repeated occurrences reaching the first threshold from the operation procedures corresponding to the debug message according to an association rule algorithm, and concludes the operation procedures included in the maximum combination to be the error procedure rule. In other words, the error procedure rule is obtained through the message analysis module 112 combining the procedures of the repeatedly appeared operations, settings, events and errors according to a data mining technique.

For example, referring to FIG. 5, in the present embodiment, the number (i.e. the first threshold) of repeated occurrences of the debug message is set to 2. The message analysis module 112 analyzes the debug messages in the debug message list 500 according to the association rule algorithm, and finds a maximum combination of the operation procedures associated with each other and having the number of repeated occurrences reaching the number of 2 according to a time sequence, and concludes the combination content as the error procedure rule (shown in the following Table 1).

TABLE 1

| Error procedure rule identifier | Operation referential number | Operation content | Repeated times |
|---|---|---|---|
| 1 | 1 | System; operation; execute camera APP | 2 |
| 1 | 2 | Camera; setting; multiple burst | 2 |
| 1 | 3 | Keyboard; operation; press shutter button | 2 |
| 1 | 4 | Camera; operation; take multiple photos | 2 |
| 1 | 5 | System; error; camera APP crash | 2 |

According to Table 1, it is known that the fields recorded in the error procedure rule table include fields of error procedure rule identifier, operation referential number, operation content and repeated times. The operation referential number records a corresponding sequence of the operation procedures in the error procedure rule. The operation content records contents of the debug messages corresponding to the operation procedures. The repeated times records the number of repeated occurrences of the operation procedures.

It should be noticed that when the message analysis module 112 analyzes the debug messages, the message analysis module 112 further filters out the debug messages with inconsistent identifiers. In detail, in an embodiment, when the message analysis module 112 analyzes the debug messages, the message analysis module 112 reads header data of each debug message, and determines whether an identifier in the header data is consistent with a preset identifier. If the identifier in the header data is not consistent with the preset identifier, the message analysis module 112 filters out the corresponding debug message.

For example, referring to the example of FIG. 5, in an embodiment, the message analysis module 112 only captures the debug messages with the identifier of "ID777" to analyze the error procedure rule, so as to filter out the debug message that is non-related to error occurrence: "05. 2013/6/1-12:00:32 start gravity sensor" in the debug message list 500.

It should be noticed that after the error procedure rule is concluded, the message analysis module 112 may further store the error procedure rule in an analysis database. The message analysis module 112, for example, inquires whether the analysis database includes the concluded error procedure rule. If the analysis database does not include the concluded error procedure rule, the message analysis module 112 updates the error procedure rule to the analysis database.

Moreover, the message analysis module 112 can also establish correct procedure rules such that a developer can accurately analyze the cause of the error according to the correct procedure rules. In detail, in an embodiment, after the message obtaining module 111 obtains the debug messages, the message analysis module 112 further analyzes the debug messages to find a plurality of operation procedures associated with each other and having a number of repeated occurrences reaching a second threshold according to data of each debug message when at least one procedure ending message appears in the debug messages, and accordingly concludes the correct procedure rules.

Figure 6:
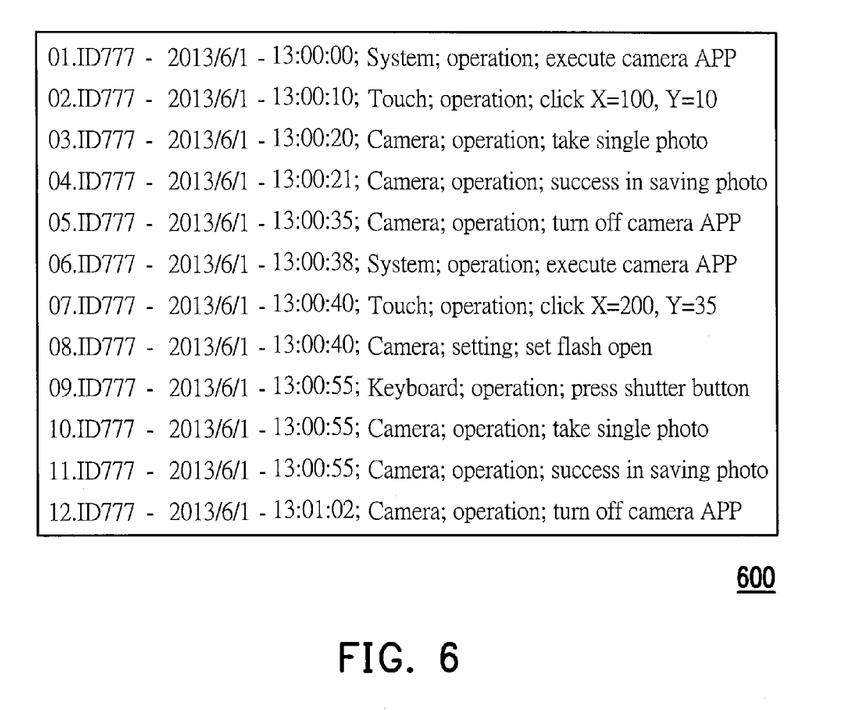
FIG. 6 is an example of concluding a correct procedure rule according to an embodiment of the invention.

An embodiment is provided below for detailed descriptions. Referring to FIG. 6 and Table 2 below, FIG. 6 is an example of concluding a correct procedure rule according to an embodiment of the invention. The debug message list 600 of the present embodiment is similar to the debug message list 500 of FIG. 5, and each of the debug messages includes field data of time, type, function and information, etc. In the present embodiment, the debug message "operation; turn off camera APP" is set as a correct procedure ending message. When the message analysis module 112 finds the correct procedure ending message in the debug message list 600 (for example, the debug message with a referential number of 05), the message analysis module 112 records an occurrence time thereof. When the correct procedure ending message again appears (for example, the debug message with a referential number of 12), the message analysis module 112 finds a maximum combination of the operation procedures having the number of repeated occurrences reaching the number of 2, and concludes the combination content as the correct procedure rule (shown in a following Table 2).

TABLE 2

| Correct procedure rule identifier | Operation referential number | Operation content | Repeated times |
|---|---|---|---|
| 1 | 1 | System, operation, execute camera APP | 2 |
| 1 | 2 | Camera, operation, take single photo | 2 |
| 1 | 3 | Camera, operation, success for saving photo | 2 |
| 1 | 4 | Camera, operation, turn off camera APP | 2 |

Referring back to the flow of FIG. 2, after the message analysis module 112 concludes the error procedure rules, the comparison module 113 sequentially compares each debug message obtained afterwards by the message obtaining module 111 with the operation procedures in each error procedure rule (step S206), so as to determine whether a completion percentage of the operation procedures in each error procedure rule reaches a preset percentage (step S208). When the completion percentage reaches the preset percentage, the control module 114 executes a preventive operation of the operation procedure corresponding to the current debug message (step S210). In other words, the comparison module 113 determines whether the currently executed operation procedure reaches a specific step in an error procedure rule and a completion percentage thereof reaches a certain percentage, and when determination results thereof are affirmative, the comparison module 113 determines that the later operations may result in an error, and the control module 114 performs the corresponding preventive operation to prevent the user from continually executing the operation procedure that will cause the error.

In detail, in an embodiment, the comparison module 113 establishes a comparison state table, and records a rule identifier and the preset percentage of each error procedure rule in the comparison state table, and updates the number of batches and the corresponding completion percentage of the operation procedures complied with the debug messages in each error procedure rule in the comparison state table according to the comparison result. The comparison state table can be stored in the analysis database, and the completion percentage can be obtained according to a ratio between the operation referential number of the current operation procedure in the error procedure rule and a total number of the operation referential numbers in the error procedure rule. Taking Table 1 as an example, the total number of the operation referential numbers of the error procedure rule is 5. Therefore, when the current operation procedure corresponds to a completed operation procedure with the operation referential number of 1, it is known that the completion percentage is 20%, and when the current operation procedure corresponds to a completed operation procedure with the operation referential number of 2, it is known that the completion percentage is 40%, and so on.

Figure 7:
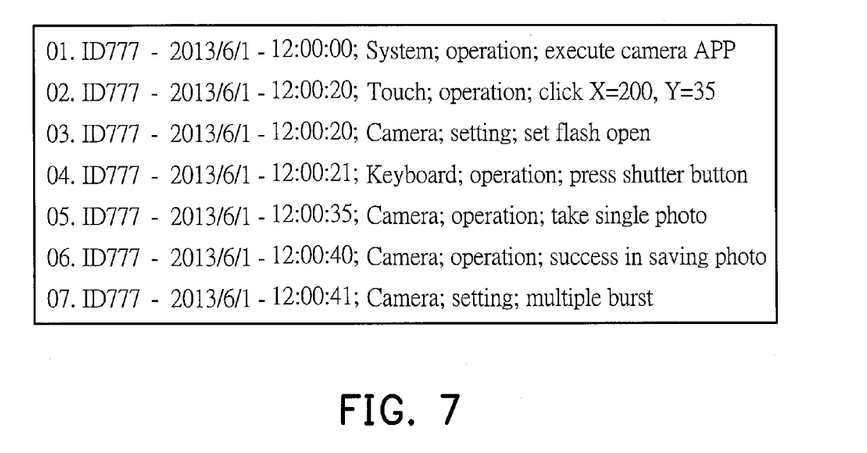
FIG. 7 is an example of a method for automatic debugging and error prevention according to an embodiment of the invention.

According to the error procedure rule of Table 1 and the correct procedure rule of Table 2, an embodiment is provided to describe a method that the comparison module 113 establishes the comparison state table. Referring to FIG. 7, FIG. 7 is an example of the method for automatic debugging and error prevention according to an embodiment of the invention, in which a plurality of debug messages obtained by the message obtaining module 111 are illustrated. In the present embodiment, the message obtaining module 111 obtains a debug message (with a referential number of 01) of "execute camera APP". The comparison module 113 determines that the debug message corresponds to the error procedure rule with the error procedure identifier of 1, and corresponds to the operation procedure with the operation referential number of 1, and the comparison module 113 records the completion percentage as 20%.

It should be noticed that in the present embodiment, when the comparison module 113 determines that the debug message corresponds to the error procedure rule, the correct procedure rules are neglected, and the debug message is no longer compared to the correct procedure rules.

Thereafter, the comparison module 113 further compares the debug message obtained by the message obtaining module 111 with the error procedure rules and the correct procedure rules. If the comparison module 113 determines that the debug message does not have the corresponding operation procedure in both of the error procedure rules and the correct procedure rules, the comparison module 113 directly performs comparison of a next debug message. For example, a debug message "click X=200, Y=35" with the referential number of 02, a debug message "set flash open" with the referential number of 03, and a debug message "press shutter button" with the referential number of 04 do not have the corresponding operation procedure in both of the error procedure rules and the correct procedure rules, and after comparing the debug message with the referential number of 04, the comparison module 113 continually compares the debug message with the referential number of 05. Regarding the debug message "take single photo" with the referential number of 05 and the debug message "success for saving photo" with the referential number of 06, the comparison module 113 discovers that the corresponding operation procedures of the above debug messages can be found in the correct procedure rule of Table 2 after comparison.

After the message obtaining module 111 captures the debug message "multiple burst" with the referential number of 07, the comparison module 113 compares the same and finds the corresponding operation procedure (i.e. the operation procedure with the operation referential number of 2 in Table 1) in the error procedure rule (with identifier of 1). Therefore, it is deduced that the completion percentage of the error procedure rule is 40%. In the present embodiment, the preset percentage is 40% as shown in Table 3. In other words, after the comparison module 113 completes comparing the debug message with the referential number of 07, the completion percentage has reached the preset percentage, i.e. the comparison module 113 can determine that the current operation procedure is complied with the error procedure rule with the error procedure identifier of 1, and the control module 114 executes the preventive operation of the operation procedure corresponding to the debug message with the referential number of 07. After the comparison module 113 completes the comparison of the debug message with the referential number of 07, the content recorded in the comparison state table is listed in the following Table 3.

TABLE 3

| Error procedure rule identifier | Current operation referential number | Preset percentage | Completion percentage |
| --- | --- | --- | --- |
| 1 | 2 | 40% | 40% |

According to the Table 3, it is known that the comparison state table records the current operation referential number, the preset percentage and the completion percentage. The field data of the Table 3 has been described in detail in the above embodiment, and is not repeated herein.

Figure 8:
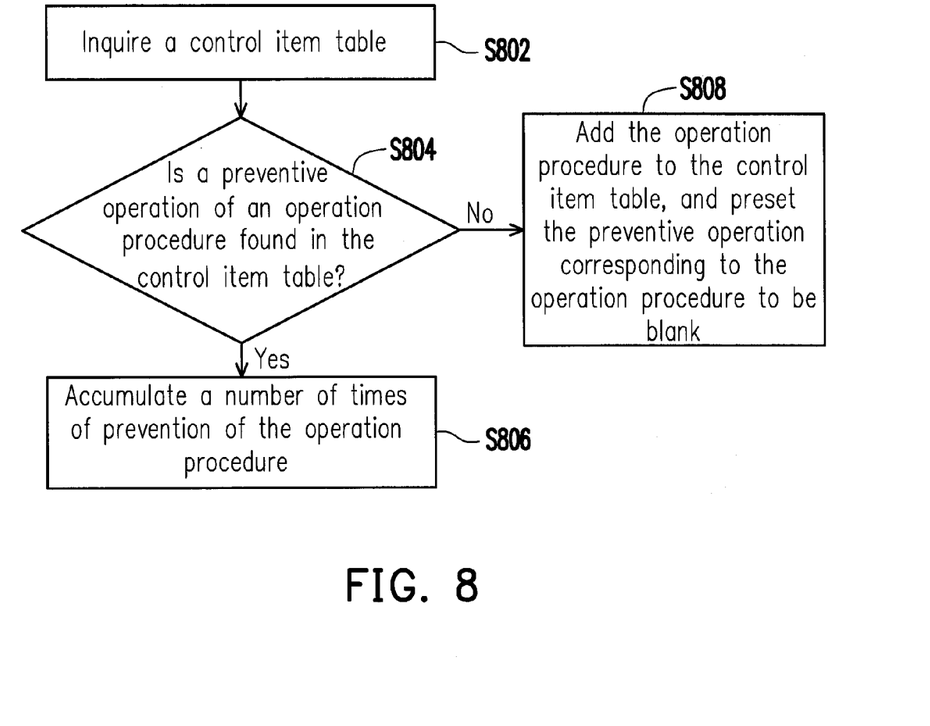
FIG. 8 is a flowchart illustrating a method for automatic debugging and error prevention according to an embodiment of the invention.

In an embodiment, before the control module 114 executes the preventive operation, the control module 114 further inquires a preset control item table to find the preventive operation used for preventing occurrence of the error of the operation procedure. In detail, FIG. 8 is a flowchart illustrating a method for automatic debugging and error prevention according to an embodiment of the invention. Referring to FIG. 8, when the control module 114 is about to execute the preventive operation of the operation procedure corresponding to the debug message, the control module 114 first inquires a control item table (step S802) and determines whether the preventive operation of the operation procedure is found in the control item table (step S804). If the preventive operation of the operation procedure is found in the control item table, the control module 114 accumulates a number of times of prevention of the operation procedure (step S806). On the other hand, if the control module 114 cannot find the preventive operation of the operation procedure in the control item table, the control module 114 adds the operation procedure to the control item table, and presets the preventive operation corresponding to the operation procedure to be blank (step S808).

The above control item table is shown as following Table 4 including fields of type, function, error procedure, preventive operation and prevention times. In an embodiment of the invention, when the control module 114 tries to find the corresponding preventive operation of the debug message "multiple burst", the control module 114 finds the preventive operation of "prohibit setting multiple burst" corresponding to the "multiple burst" from the Table 4, and executes the function of "prohibit setting multiple burst", so as to prevent error occurrence or system failure of the electronic apparatus 100. After executing the above function, the control module 114 adds the prevention times of the preventive operation in the control item table by 1 for reference.

TABLE 4

| Type | Function | Error procedure | Preventive operation | Prevention times |
| --- | --- | --- | --- | --- |
| System | Operation | Execute camera APP | Prohibit executing camera APP | 0 |
| Keyboard | Operation | Press shutter button | Prohibit pressing shutter button | 0 |
| Camera | Operation | Take single photo | Prohibit taking single photo | 0 |
| Camera | Setting | Multiple burst | Prohibit setting multiple burst | 1 |
| Camera | Operation | Take multiple photos | | 1 |

In another embodiment, when the control module 114 tries to find the corresponding preventive operation of the debug message "take multiple photos", since the preventive operation corresponding to "take multiple photos" cannot be found in the Table 4, the control module 114 adds the operation procedure of "take multiple photos" to the control item table, and presets the preventive operation corresponding to the operation procedure of "take multiple photos" to be blank, so as to prompt the developer that the corresponding preventive operation of the above operation procedure cannot be found.

In summary, according to the method for automatic debugging and error prevention of the present embodiment, by concluding the error procedure rules and comparing the completion percentage of the operation procedure corresponding to the error procedure rule, it is determined whether the currently executed operation procedure is complied with the error procedure rule, so as to execute the corresponding preventive operation to prevent error occurrence or system failure of the electronic apparatus 100.

It should be noticed that besides automatically concluding the error procedure rule to compare the debug messages and execute the preventive operation, an embodiment of the invention further provides a dynamic adjustment mechanism, by which a success rate of the electronic apparatus 100 for preventing the error occurrence is calculated according to the error procedure rule, so as to adaptively adjust the preset percentage used for determining an execution timing of the preventive operation, such that the electronic apparatus 100 can execute the preventive operation at a better time point. In brief, under a premise that the error is not occurred to the electronic apparatus 100, the time point of executing the preventive operation is postponed (i.e. the preset percentage is increased) as far as possible, so as to provide flexibility in operating the functions of the electronic apparatus 100 (i.e. the applicable functions or operation procedures are increased). An embodiment is provided below for detailed descriptions.

Figure 9:
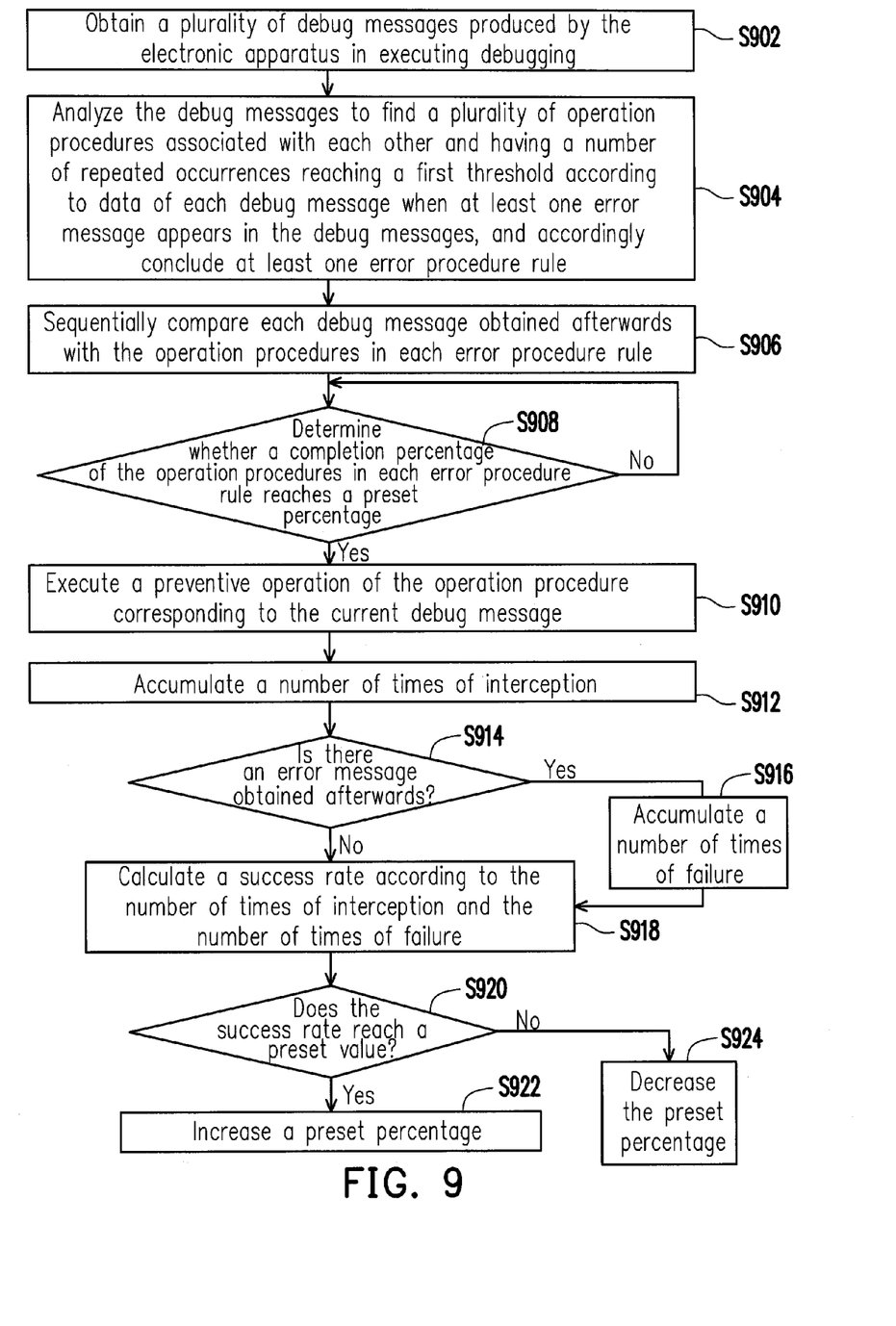
FIG. 9 is a flowchart illustrating a method for automatic debugging and error prevention according to an embodiment of the invention.

FIG. 9 is a flowchart illustrating a method for automatic debugging and error prevention according to an embodiment of the invention. Referring to FIG. 9, first, the message obtaining module 111 obtains a plurality of debug messages produced by the electronic apparatus 100 in executing debugging (step S902). Then, the message analysis module 112 analyzes the debug messages and finds a plurality of operation procedures associated with each other and having a number of repeated occurrences reaching a first threshold according to data of each debug message when at least one error message appears in the debug messages and accordingly concludes at least one error procedure rule (step S904). Then, the comparison module 113 sequentially compares each debug message obtained afterwards by the message obtaining module 111 with the operation procedures in each error procedure rule (step S906), so as to determine whether a completion percentage of the operation procedures in each error procedure rule reaches a preset percentage (step S908). When the completion percentage reaches the preset percentage, the control module 114 executes a preventive operation of the operation procedure corresponding to the current debug message (step S910). The steps S902-S910 are similar to the steps S202-S210 of FIG. 2, and details thereof can refer to the aforementioned descriptions.

Different from the aforementioned embodiment, in the present embodiment, after the control module 114 executes the preventive operation of the operation procedure corresponding to the current debug message, the message analysis module 112 accumulates a number of times of interception (step S912). Thereafter, the message analysis module 112 determines whether the message obtaining module 111 obtains the error message afterwards (step S914). In an embodiment, the control module 114 can determine whether the error message is obtained in subsequent procedure operation according to whether the completion percentage in the comparison state table is 100%. In an embodiment, the control module 114 can directly send an error message obtaining notification to the message analysis module 112 when the message obtaining module 111 obtains the error message, for example, "camera APP crash." Those skilled in the art may apply the technique of determining whether the message obtaining module 111 obtains the error message afterwards according to an actual requirement thereof, which is not limited by the invention.

If the message obtaining module 111 obtains the error message afterwards, it is regarded that the task of using the error procedure rule to implement the error prevention is not successful, and the message analysis module 112 accumulates a number of times of failure (step S916) to add the number of times of failure by 1. It should be noticed that when the completion percentage in the comparison state table is 100%, or when the message obtaining module 110 obtains the correct procedure ending message afterwards, the message analysis module 112 clears a record of the current operation and the completion percentage for comparison of a next error procedure rule.

Referring back to the flow of FIG. 9, the message analysis module 112 calculates a success rate according to the number of times of interception and the number of times of failure (step S918). In detail, in an embodiment, the success rate is obtained by calculating a difference between the number of times of interception and the number of times of failure and then calculating a ratio between the difference and the number of times of interception. Thereafter, the message analysis module 112 determines whether the success rate reaches a preset value (step S920). The present value can be a preset success rate of debugging and error prevention that is set by the developer. If the success rate reaches the preset value, the message analysis module 112 increases the preset percentage (step S922). If the success rate does not reach the preset value, the message analysis module 112 decreases the preset percentage (step S924). In this way, the preset percentage of procedure completion is adjusted by calculating the success rate of debugging and error prevention, such that comparison of the operation procedure and the error procedure rule can be more accurate, so as to improve accuracy of the method for automatic debugging and error prevention of the present embodiment.

It should be noticed that the electronic apparatus 100 of the present embodiment may provide more diversified applications by establishing a connection with a development end. In detail, in an embodiment, when the message analysis module 112 concludes and obtains a new error procedure rule or a correct procedure rule, the electronic apparatus 100 may automatically establish a connection with a host of the development end for reporting the obtained new error/correct procedure rule. On the other hand, the error procedure rule, the correct procedure rule, the comparison state table and the control item table of each of the aforesaid embodiments can be stored in the analysis database, such that the developer may access the electronic apparatus 100 so as to obtain or update the content recorded in the analysis database. Moreover, in another embodiment, a comparison process that the comparison module 113 compares the debug message with the error/correct procedure rule can also be stored in the analysis database through a file recording manner, such that the development end can obtain the comparison history and use the same as a reference.

The invention further provides a non-transitory computer readable medium, which records a computer program to be loaded into an electronic apparatus to implement various steps of the method for automatic debugging and error prevention. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the method for automatic debugging and error prevention described above.

In summary, according to the method, the apparatus and the computer readable medium for automatic debugging and error prevention of the invention, the error procedure rule is concluded, and the completion percentage of the operation procedure corresponding to the error procedure rule is compared to determine whether currently executed operation procedure is complied with the error procedure rule. When it is determined that the currently executed operation procedure is complied with the error procedure rule, the corresponding preventive operation is executed. Moreover, by calculating the success rate of the automatic debugging and error prevention and adjusting the preset percentage of completion of the error procedure rule, accuracy of the automatic debugging and error prevention is increased. In this way, error occurrence can be prevented to improve stability of the electronic apparatus, so as to provide the user a better operation experience.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for automatic debugging and error prevention, adapted to an electronic apparatus, comprising:
    obtaining a plurality of debug messages produced by the electronic apparatus in executing debugging;
    analyzing the debug messages to find a plurality of operation procedures associated with each other and having a number of repeated occurrences reaching a first threshold according to data of each debug message when at least one error message appears in the debug messages, and accordingly concluding at least one error procedure rule;
    sequentially comparing each debug message obtained afterwards with the operation procedures in each error procedure rule, and accordingly determining whether a completion percentage of the operation procedures in each error procedure rule reaches a preset percentage; and
    executing a preventive operation of the operation procedure corresponding to a current debug message when the completion percentage reaches the preset percentage.

2. The method for automatic debugging and error prevention as claimed in claim 1, wherein the step of analyzing the debug messages comprises:
    reading header data of each debug message, and determining whether an identifier in the header data is consistent with a preset identifier; and
    filtering out the corresponding debug message if the identifier in the header data is not consistent with the preset identifier.

3. The method for automatic debugging and error prevention as claimed in claim 1, wherein the step of finding the operation procedures associated with each other and having the number of repeated occurrences reaching the first threshold according to data of each debug message and accordingly concluding the at least one error procedure rule comprises:
    finding a maximum combination of the operation procedures associated with each other and having the number of repeated occurrences reaching the first threshold from the operation procedures corresponding to the debug message according to an association rule algorithm, and concluding the operation procedures included in the maximum combination to be the error procedure rule.

4. The method for automatic debugging and error prevention as claimed in claim 1, wherein after the step of finding the operation procedures associated with each other and having the number of repeated occurrences reaching the first threshold according to data of each debug message and accordingly concluding the at least one error procedure rule, the method further comprises:
    inquiring whether an analysis database comprises the concluded error procedure rule; and
    updating the error procedure rule to the analysis database if the analysis database does not comprise the concluded error procedure rule.

5. The method for automatic debugging and error prevention as claimed in claim 1, wherein after the step of obtaining the debug messages produced by the electronic apparatus in executing debugging, the method further comprises:
    analyzing the debug messages to find a plurality of operation procedures associated with each other and having a number of repeated occurrences reaching a second threshold according to data of each debug message when at least one procedure ending message appears in the debug messages, and accordingly concluding at least one correct procedure rule.

6. The method for automatic debugging and error prevention as claimed in claim 1, wherein the step of sequentially comparing each debug message obtained afterwards with the operation procedures in each error procedure rule comprises:
    establishing a comparison state table, and recording a rule identifier and the preset percentage of each error procedure rule in the comparison state table; and
    updating a number of batches and the corresponding completion percentage of the operation procedures complied with the debug messages in each error procedure rule in the comparison state table according to a comparison result.

7. The method for automatic debugging and error prevention as claimed in claim 1, wherein after the step of executing the preventive operation of the operation procedure corresponding to the current debug message, the method further comprises:
    accumulating a number of times of interception, and determining whether the error message is obtained afterwards;
    accumulating a number of times of failure when the error message is obtained, and calculating a success rate according to the number of times of interception and the number of times of failure, and accordingly determine whether the success rate reaches a preset value;
    increasing the preset percentage if the success rate reaches the preset value; and
    decreasing the preset percentage if the success rate does not reach the preset value.

8. The method for automatic debugging and error prevention as claimed in claim 1, wherein before the step of executing the preventive operation of the operation procedure corresponding to the current debug message, the method further comprises:

inquiring a control item table to find the preventive operation used for preventing error occurrence of the operation procedure.

9. The method for automatic debugging and error prevention as claimed in claim 8, wherein the step of inquiring the control item table to find the preventive operation used for preventing error occurrence of the operation procedure comprises:

accumulating a number of times of prevention of the operation procedure if the preventive operation of the operation procedure is found in the control item table; and adding the operation procedure to the control item table and presetting the preventive operation corresponding to the operation procedure to be blank if the preventive operation of the operation procedure is not found in the control item table.

10. The method for automatic debugging and error prevention as claimed in claim 8, wherein the step of obtaining the debug messages produced by the electronic apparatus in executing debugging comprises:

obtaining the debug messages from a universal asynchronous receiver-transmitter (UART) driver of the electronic apparatus or an application program interface (API) recording program of each application program in the electronic apparatus.

11. An apparatus for automatic debugging and error prevention, comprising:

a storage unit, recording a plurality of modules; and one or a plurality of processing units, coupled to the storage unit, accessing and executing the modules recorded in the storage unit, and the modules comprising:

a message obtaining module, obtaining a plurality of debug messages produced by the apparatus in executing debugging;

a message analysis module, analyzing the debug messages and finding a plurality of operation procedures associated with each other and having a number of repeated occurrences reaching a first threshold according to data of each debug message when at least one error message appears in the debug messages, and accordingly concluding at least one error procedure rule;

a comparison module, sequentially comparing each debug message obtained afterwards by the message obtaining module with the operation procedures in each error procedure rule, and accordingly determining whether a completion percentage of the operation procedures in each error procedure rule reaches a preset percentage; and a control module, executing a preventive operation of the operation procedure corresponding to a current debug message when the comparison module determines that the completion percentage reaches the preset percentage.

12. The apparatus for automatic debugging and error prevention as claimed in claim 11, wherein the message analysis module reads header data of each debug message, and filters out the debug message with an identifier in the header data thereof being not consistent with a preset identifier.

13. The apparatus for automatic debugging and error prevention as claimed in claim 11, wherein the message analysis module finds a maximum combination of the operation procedures associated with each other and having the number of repeated occurrences reaching the first threshold from the operation procedures corresponding to the debug message according to an association rule algorithm, and concludes the operation procedures included in the maximum combination to be the error procedure rule.

14. The apparatus for automatic debugging and error prevention as claimed in claim 11, wherein the message analysis module further inquires whether an analysis database comprises the concluded error procedure rule, and updates the error procedure rule to the analysis database if the analysis database does not comprise the concluded error procedure rule.

15. The apparatus for automatic debugging and error prevention as claimed in claim 11, wherein the message analysis module further analyzes the debug messages to find a plurality of operation procedures associated with each other and having a number of repeated occurrences reaching a second threshold according to data of each debug message when at least one procedure ending message appears in the debug messages and accordingly conclude at least one correct procedure rule.

16. The apparatus for automatic debugging and error prevention as claimed in claim 11, wherein the comparison module establishes a comparison state table, and records a rule identifier and the preset percentage of each error procedure rule in the comparison state table, and updates a number of batches and the corresponding completion percentage of the operation procedures complied with the debug messages in each error procedure rule in the comparison state table according to a comparison result.

17. The apparatus for automatic debugging and error prevention as claimed in claim 11, wherein the message analysis module accumulates a number of times of interception after the control module executes the preventive operation of the operation procedure corresponding to the current debug message, and determines whether the message obtaining module obtains the error message afterwards, wherein when the message obtaining module obtains the error message, the message analysis module accumulates a number of times of failure, and calculates a success rate according to the number of times of interception and the number of times of failure, so as to determine whether the success rate reaches a preset value, and the message analysis module increases the preset percentage if the success rate reaches the preset value, and decreases the preset percentage if the success rate does not reach the preset value.

18. The apparatus for automatic debugging and error prevention as claimed in claim 11, wherein the control module further inquires a control item table to find the preventive operation used for preventing error occurrence of the operation procedure.

19. The apparatus for automatic debugging and error prevention as claimed in claim 18, wherein the control module further accumulates a number of times of prevention of the operation procedure when the preventive operation of the operation procedure is found in the control item table, and the control module adds the operation procedure to the control item table when the preventive operation of the operation procedure is not found in the control item table, and presets the preventive operation corresponding to the operation procedure to be blank.

20. A non-transitory computer readable medium, recording a computer program to be loaded to an electronic apparatus to execute following steps;

obtaining a plurality of debug messages produced by the electronic apparatus in executing debugging;

analyzing the debug messages to find a plurality of operation procedures associated with each other and having a number of repeated occurrences reaching a first threshold according to data of each debug message when at least one error message appears in the debug messages, and accordingly concluding at least one error procedure rule;

sequentially comparing each debug message obtained afterwards with the operation procedures in each error procedure rule, so as to determine whether a completion percentage of the operation procedures in each error procedure rule reaches a preset percentage; and executing a preventive operation of the operation procedure corresponding to a current debug message when the completion percentage reaches the preset percentage.

* * * * *